(12) United States Patent
Aday et al.

(10) Patent No.: US 7,171,391 B2
(45) Date of Patent: Jan. 30, 2007

(54) CUSTOM PRICING SYSTEM AND METHOD

(75) Inventors: Donald G. Aday, Essex Junction, VT (US); Timothy W. Clancy, Hinesburg, VT (US); Peter E. Walker, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 09/683,733

(22) Filed: Feb. 7, 2002

(65) Prior Publication Data

US 2003/0149673 A1  Aug. 7, 2003

(51) Int. Cl.
G06Q 99/00 (2006.01)

(52) U.S. Cl. .................... 705/400; 700/97; 700/121

(58) Field of Classification Search .............. 705/400; 700/121, 97
See application file for complete search history.

(56) References Cited

U.S. PATENT DOCUMENTS

| 5,960,417 | A  |   | 9/1999  | Pan et al. ............... 705/400 |
| 6,249,776 | B1 |   | 6/2001  | Bajuk et al. ............ 705/400 |
| 6,252,981 | B1 | * | 6/2001  | Guest et al. ............ 382/149 |
| 6,529,790 | B1 | * | 3/2003  | Magee et al. ........... 700/121 |
| 6,970,754 | B1 | * | 11/2005 | Nanbu et al. ........... 700/97 |
| 2001/0023418 | A1 |   | 9/2001  | Suzuki et al. .......... 705/400 |
| 2003/0125825 | A1 | * | 7/2003  | Liu ...................... 700/97 |
| 2004/0067488 | A1 | * | 4/2004  | Takegawa .............. 435/6 |

FOREIGN PATENT DOCUMENTS

JP  2001308120 A  * 11/2001

OTHER PUBLICATIONS

Ladd, Steven, "Advanced MCM design", Aug. 1995, Printed Circuit Design, v12n8, pp. 10-16, 7 pgs.*
Kuo et al., "An Overview of Manufacturing Yield and Reliability Modeling for Semiconductor Products", Aug. 1999, Proceedings of the IEEE, vol. 87, No. 8, pp. 1329-1344.*
P. K. Nag, W. Maly, and H. J. Jacobs, "Simulation of Yield/Cost Learning Curves with Y4," IEEE Transactions on Semiconductor Manufacturing, vol. 10, No. 2, pp. 256-266, May 1997.
R. Ross, J. Bailey, N. Atchison, and M. Effron, "A Comprehensive Sequential Yield Analysis Methodology and the Financial Payback for Higher Yields," 1999 IEEE/SEMI Advanced Semiconductor Manufacturing Conference, pp. 80-86, 1999.

(Continued)

*Primary Examiner*—John W. Hayes
*Assistant Examiner*—Freda A Nelson
(74) *Attorney, Agent, or Firm*—Richard M. Kotulak, Esq.; Hoffman, Warnick & D'Alessandro, LLC

(57) ABSTRACT

The invention provides a computerized system and method for calculating a custom die price. Specifically, the invention provides an interface for designating base parameters and custom parameters. A reference die is synthetically created based on a design methodology and the base parameters. Based on the reference die and the custom parameters, a complexity factor is calculated. The custom die price can then be calculated based on the base parameters, custom parameters and the complexity factor.

26 Claims, 4 Drawing Sheets

OTHER PUBLICATIONS

C. A. Moritz, D. Yeung, and A. Agarwal, "SimpleFit: A Framework for Analyzing Design Trade-Offs in Raw Architectures," IEEE Transactions on Parallel and Distributed Systems, vol. 12, No. 7, pp. 730-742, Jul. 2001.

G. A. Allan and A. J. Walton, "Fast Yield Prediction for Accurate Costing of ICs," 1996 Innovative Systems in Silicon Conference, Session 8: Yield & Testing, pp. 279-287, 1996.

nTool Solutions, http://www.ntool.com/ntool/Solutions/Cps/Ndiesizer/Ndiesizer.html, printed Oct. 8, 2001.

"UMC Unveils Chipsizer: Online Tool Estimates Die Size and Silicon Cost," http://www.umc.com/english/news/20001030.asp, Oct. 30, 2000.

"UMC Chipsizer" http://eproject.umc.com/dse/, printed Oct. 8, 2001.

D. N. Maynard, R. J. Rosner, M. L. Kerbaugh, R. A. Hamilton, J. R. Bentlage, and C. A. Boye, "Wafer Line Productivity Optimization in a Multi-Technology Multi-Part-Number Fabricator," 1998 IEEE/SEMI Advanced Semiconductor Manufacturing Conference, pp. 34-42, 1998.

* cited by examiner

CUSTOM PRICING SYSTEM AND METHOD

BACKGROUND OF THE INVENTION

1. Technical Field

The present invention relates to a custom pricing system and method. Specifically, the invention calculates a custom die price based on designated parameters and a calculated complexity factor. The invention can further calculate a chip price based on the custom die price and other factors, such as packaging and quantity.

2. Background Art

In the production of electronic devices, chips are often required. In general, a chip can be defined by a die and a package. The die includes the parameters required to build a functional chip, while the package includes parameters defining how the chip interacts with its environment. While many types of standard dies and packaging can be offered by a chip manufacturer, customers frequently need a custom chip and/or packaging for certain applications. As a result, manufacturers frequently provide customers with the ability to order a chip that has one or more parameters that differ from their standard chips.

For many applications, several configurations of dies and packages can solve a particular challenge or situation. In determining the appropriate die and/or package configuration, customers generally seek to minimize the cost of obtaining the die and/or package. Therefore, a customer may make several price inquiries with different die configurations and/or different packaging options to the manufacturer. Frequently, the customer will seek to quickly resolve this process so that manufacturing and further design can move forward.

From a manufacturer's perspective, accurate pricing is critical in being able to profitably manufacture custom chips. To do this, the manufacturer must accurately anticipate the costs of manufacturing the chips and factor in a desired profit to arrive at a final price. A manufacturer that over-estimates costs can lose business to other manufacturers. Conversely, a manufacturer that under-estimates costs may lose their profit for a particular custom job. Additionally, the manufacturer generally seeks to minimize the time required for a customer to place an order while simultaneously minimizing the burden on its own operations. This allows for faster orders at less cost, and more satisfied customers. Consequently, accurate and timely pricing for different custom dies with or without custom packaging is important from both the customer and manufacturer perspectives.

Currently, the process used to obtain the desired pricing is inefficient and confusing for the customer. For example, a manufacturer may provide a customer with a spreadsheet price guide. The price guide may contain entries for various solutions, including custom die options with packaging options. The customer can then look up a solution and determine its cost. However, if the customer desires to slightly modify a solution, he/she is frequently required to obtain a custom quote from the manufacturer. The customer may make many inquiries for custom quotes before determining a satisfactory price/performance trade off for the solution. Because of the lack of customer knowledge, the quote may be unsatisfactory and cause frustration for the customer. As a result, the customer may waste design resources, become dissatisfied with the manufacturer and/or seek other vendors. The process can further frustrate the customer when a desired packaging option has not been determined, but a quotation for a custom die is desired. From the manufacturer's perspective, an engineer is frequently required to analyze the custom solutions provided by the customer and generate the custom quotations. This process can be time consuming and also inefficiently uses the employee's skills.

SUMMARY OF THE INVENTION

Therefore, there exists the need for a customer to quickly and easily obtain price quotations for custom dies with varying parameters. There exists a further need to incorporate the custom die price into a pricing system that provides a custom chip price by accounting for other factors, including volume and packaging. A further need exists for such a system to be computer/web based for easy and efficient access.

The current invention provides a computer based custom die pricing method and system. Under the invention, various die parameters are designated and a reference die is created. The reference die is used to calculate a complexity factor, which is used to calculate the custom die price. Using the invention, a customer can quickly and easily determine a custom die that is most appropriate for his/her particular challenge or situation. The invention can further provide custom quotations for a custom chip based on the custom die.

A first aspect of the invention provides a computerized method of calculating a custom die price, comprising: providing an interface for designating base parameters; selecting a base die based on the base parameters; creating a reference die based on a design methodology and the base parameters; calculating a complexity factor based on designated custom parameters and the reference die; and calculating the custom die price based on the base die, the custom parameters and the complexity factor.

A second aspect of the invention provides a computerized method of calculating a custom die price, comprising: designating base parameters; calculating a base die price based on the base parameters; creating a reference die based on a design methodology and the base parameters; creating a custom die by designating custom parameters; calculating a complexity factor based on the custom die and the reference die; and calculating the custom die price based on the base die price, the custom die and the complexity factor.

A third aspect of the invention provides a system for determining a custom die price, comprising: a base die system for designating base parameters; a reference die system for creating a reference die based on the base parameters and a design methodology; a custom die system for designating custom parameters; a complexity system for calculating a complexity factor based on the custom parameters and the reference die; and a calculation system for calculating the custom die price based on the base parameters, the custom parameters and the complexity factor.

A fourth aspect of the invention provides a computer program product comprising a computer useable medium having computer readable program code embodied therein for determining a custom die price, the program product comprising: program code for designating base parameters; program code for calculating a base die price based on the base parameters; program code for creating a reference die based on a design methodology and the base parameters; program code for creating a custom die by designating custom parameters; program code for calculating a complexity factor based on the custom die and the reference die; and program code for calculating a custom die price based on the base die price, the custom die and the complexity factor.

The exemplary aspects of the present invention are designed to solve the problems herein described and other problems not discussed, which are discoverable by a skilled artisan.

BRIEF DESCRIPTION OF THE DRAWINGS

These and other features and advantages of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Generally stated, the present invention calculates a custom die price based on designated parameters and a complexity factor. The complexity factor is calculated based on a reference die, created from a portion of the designated parameters.

Figure 1:
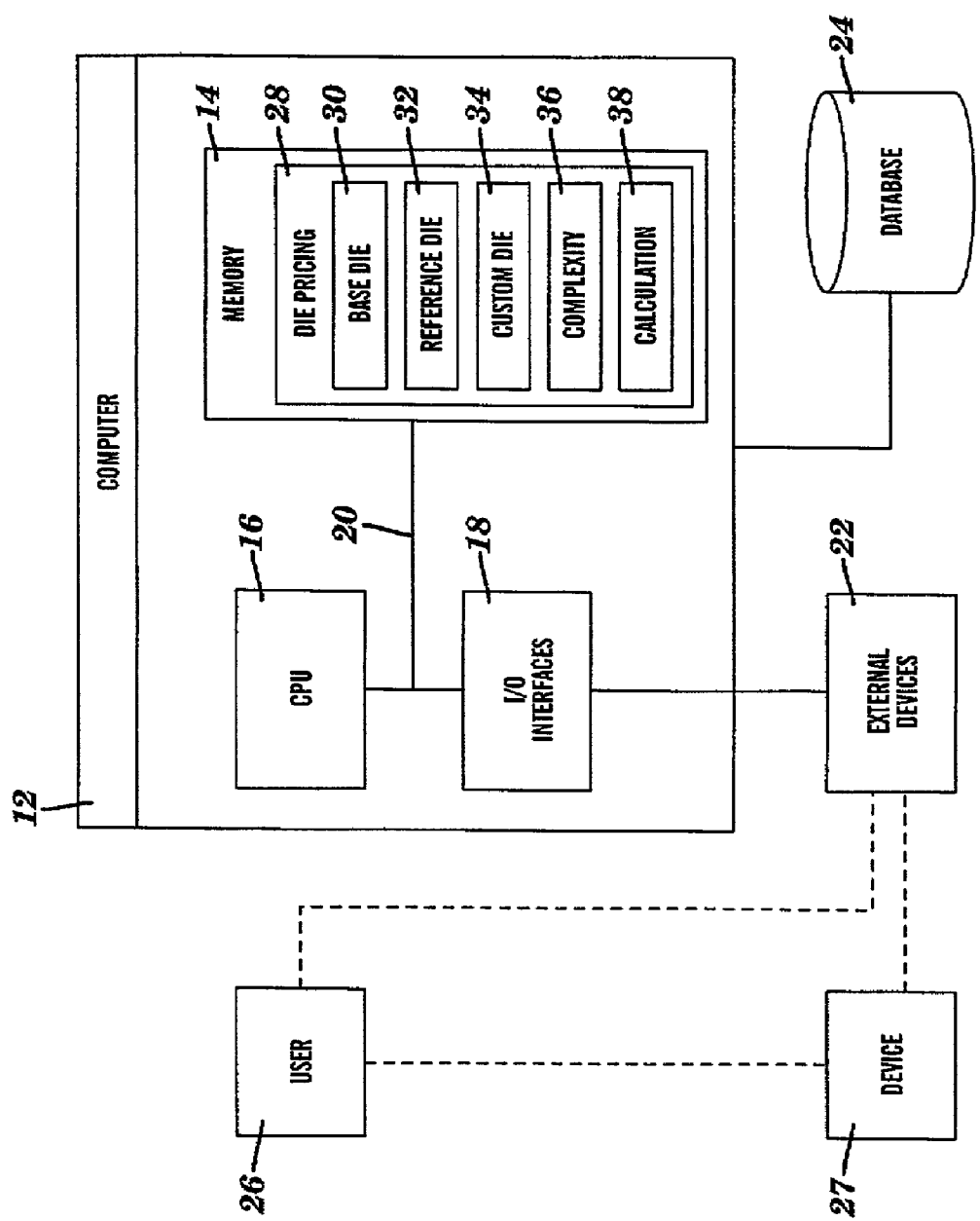
FIG. 1 depicts a die pricing system according to one aspect of the invention.

Turning to FIG. 1, a die pricing system according to one aspect of the invention is depicted. Custom pricing system 10 generally comprises computer 12 and die pricing system 28. User 26 can interact with computer 12 and die pricing system 28 to obtain a custom die price.

Computer 12 generally comprises memory 14, central processing unit (CPU) 16, input/output (I/O) interfaces 18 and bus 20. A database 24 may also be provided for storage of data relative to processing tasks. Memory 14 (and database 24) may comprise any known type of data storage and/or transmission media, including magnetic media, optical media, random access memory (RAM), read-only memory (ROM), a data cache, a data object, etc. Moreover, memory 14 (and database 24) may reside at a single physical location, comprising one or more types of data storage, or be distributed across a plurality of physical systems in various forms. CPU 16 may comprise a single processing unit, or be distributed across one or more processing units in one or more locations, e.g., on a client and server. A server computer typically comprises an advanced mid-range multiprocessor-based server, such as the RS6000 from IBM, utilizing standard operating system software, which is designed to drive the operation of the particular hardware and which is compatible with other system components and I/O controllers. I/O interfaces 18 may comprise any system for exchanging information with one or more external devices 22. For example, external devices 22 may comprise any known type of input/output device including an I/O port (serial or parallel), an universal serial bus (USB) controller, a network system, modem, keyboard, mouse, scanner, voice recognition system, monitor (cathode-ray tube (CRT), liquid-crystal display (LCD), etc.), printer, disc drives, etc. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Die pricing system 28 is shown stored in memory 14. Die pricing system 28 generally includes base die system 30, reference die system 32, custom die system 34, complexity system 36 and calculation system 38. User 26 can interact with die pricing system 28 to obtain a custom price for a die. User 26 may interact with die pricing system 28 by interacting directly with external devices 22, and/or by interacting with another computing device 27 in communication with computer 12 in a client-server environment. For example, device 27 could communicate with computer 12 through a direct connection, a private network, a virtual private network (VPN), local area network (LAN) or wide area network (WAN). For example, die pricing system 28 can execute on a computer 12 connected to the world wide web. User 26 can subsequently access the world wide web using another device and interact with die pricing system 28.

Base die system 30 includes an interface for user 26 to designate base parameters and/or select a base die. The base parameters designated by user 26 can include, for example, a technology (e.g., the Complimentary Metal-Oxide Semiconductor (CMOS) type used, copper, silicon, etc.), the die size as defined by an X-dimension and a Y-dimension, and the number of levels of metal.

In one embodiment, one or more base parameters are designated (e.g., through drop down menus or the like). A set of possible base dies is then provided from database 24, wherein each possible base die includes the first base parameter designated. For example, if a desired number of levels of metal is designated, all dies that have the specified levels of metal can be provided as possible base dies. User 26 can then select one base die from the set of possible base dies. In another embodiment, one base die is "suggested" to user 26 based on the designated parameters. In either event, calculation system 38 can then reference database 24 to determine a base die price.

Once base die parameters have been designated, user 26 can use custom die system 34 to designate custom parameters. Based on the designated custom parameters (and the base parameters), a custom die is created. Custom parameters can include, for example, any cores (3rd party circuitry placed onto a die that performs specific functions, such as networking, timers, microprocessing, etc.), oxide levels (to prevent cross-talk), a solder type (alpha level), a cell logic circuit count, register array parameters and memory parameters. The register array parameters can include the amount, whether it is a parallel or series layout, etc. Various memory parameters can include the type and amount of embedded dynamic RAM (DRAM), the type and density of static RAM (SRAM), the definition of memory macros, etc.

Reference die system 32 synthetically creates a reference die based on the base parameters (or base die) and a specific design methodology. Specifically, the reference die has the designated base parameters and predetermined custom parameters that are set based on a particular design methodology. Typically, the reference die is the most complex die that can be created based on the designated base parameters and provides a baseline for comparison with the custom die. In synthetically creating the reference die, any design methodology can be used, and any die configuration can be targeted. For example, the reference die can be created based on the IBM Application Specific Integrated Circuit (ASIC)

design methodology. Moreover, a most complex die can be defined as the most densely packed die that a manufacturer can produce given various constraints inherent to the base parameters and manufacturing process. Using the ASIC design methodology, the reference chip can be defined as fully populated with 50% logic and 50% SRAM/DRAM. Factors incorporated include die edge, cell size, wireability, enhanced DRAM (eDRAM) macro size and design rules, etc.

Once the reference die is created, complexity system 36 calculates a complexity factor based on the designated custom parameters, or custom die, and the reference die. The complexity factor provides a measure of relative complexity between the designated custom parameters (custom die) and the reference die. For example, the complexity factor can be calculated by determining a custom die yield based on the custom parameters (custom die) and a reference die yield based on the reference die. The custom die yield can then be divided by the reference die yield to provide the complexity factor. In addition to the relative yields, other factors, such as manufacturing location, time schedule, and process type (i.e., 200 mm vs. 300 mm), can be incorporated into the complexity factor.

Various methods can be used to determine the two yields. For example, a yield can be calculated as the wafer final test (WFT) or functional yield. The WFT yield is the percent of dies that meet all final parametric functional electrical test specifications, or the percent of fault-free dies. This yield can be based, at least in part, on die area. A more precise yield may be achieved by considering additional factors including circuit count, circuit type and circuit layout.

The two main components of a WFT yield are systematic (gross) defects and random defects. Various methods for predicting these defects are well known in the art. One such method uses a critical area (dependent upon the physical layout of the die) and a defect density in the fabricator (a value independent of the die) to calculate the WFT yield. Critical area is the area on the die in which the center of a defect must be located to cause a fault. The defect density can be determined by tracking the performance of the fabricator.

Once the complexity factor has been determined, calculation system 38 calculates the custom die price based on the base parameters (base die), the custom parameters (custom die) and the complexity factor. Specifically, an initial custom die price can be provided by modifying the base die price (calculated as described above) based on the custom parameters. For example, certain custom parameters can increase the custom die price relative to the base die price while other custom parameters may decrease the custom die price relative to the base die price. Once calculated, the initial custom die price can then be adjusted using the complexity factor. In one embodiment, the initial custom die price is multiplied by the complexity factor to yield the custom die price. Other methods of adjusting the custom die price can be used and are equally covered by the invention.

Figure 2:
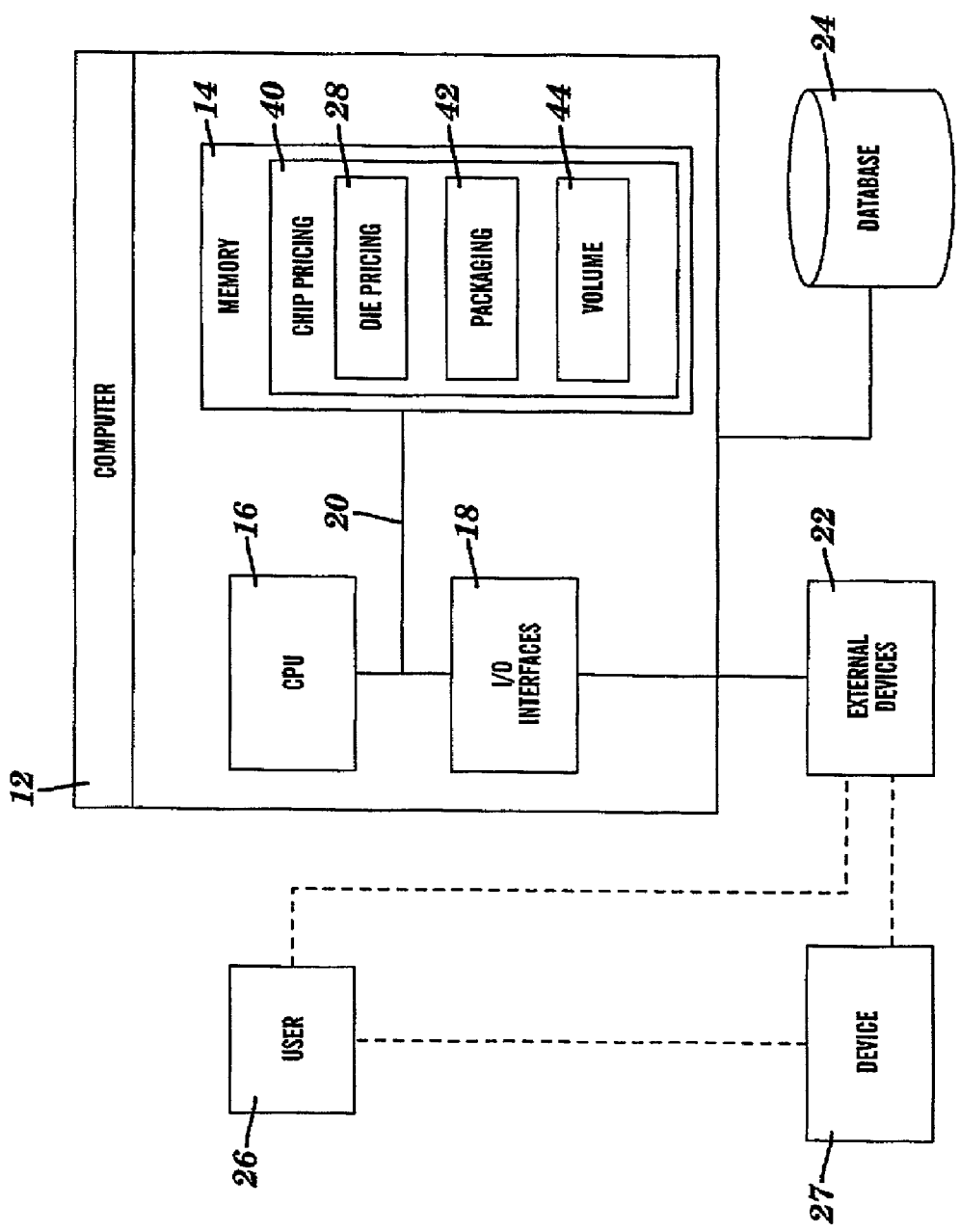
FIG. 2 depicts a chip pricing system according to one aspect of the invention.

It should be understood that custom pricing system 10 can include die pricing system 28 as well as other systems. For example, FIG. 2 depicts a custom pricing system 110 according to another aspect of the invention in which a chip price is calculated based, in part, on the custom die price. Custom pricing system 110 generally comprises computer 12 and chip pricing system 40. User 26 can interact with computer 12 and chip pricing system 40 to obtain a custom price in a substantially similar manner as previously discussed regarding die pricing system 28.

As indicated above, a chip is the combination of a die and a package. Thus, the chip price will include the custom die price. Chip pricing system 40 is shown stored in memory 14 and includes die pricing system 28, packaging system 42 and volume system 44. The discussion with reference computer 12 and its components and die pricing system 28 in FIG. 1 applies equally to FIG. 2.

Packaging system 42 calculates a chip price based on the custom die price and designated packaging parameters. Packaging parameters can include a package material (ceramic, silicon, plastic, etc.), a package size (including carrier size, chip size), a number of I/O pins/leads, layout, and pin configuration. An interface of packaging system 42 can limit the designation of packaging parameters to ensure that only valid packaging parameters and combinations of parameters are designated. The chip price can be adjusted upward or downward depending on the packaging parameters selected.

Volume system 44 can adjust a price based on a designated quantity. For example, volume system 44 can provide an interface for designating a chip quantity. Based on the chip quantity, volume system 44 can adjust the chip price upward or downward. Alternatively, volume system 44 can adjust the die price and/or package price independently.

Figure 3:
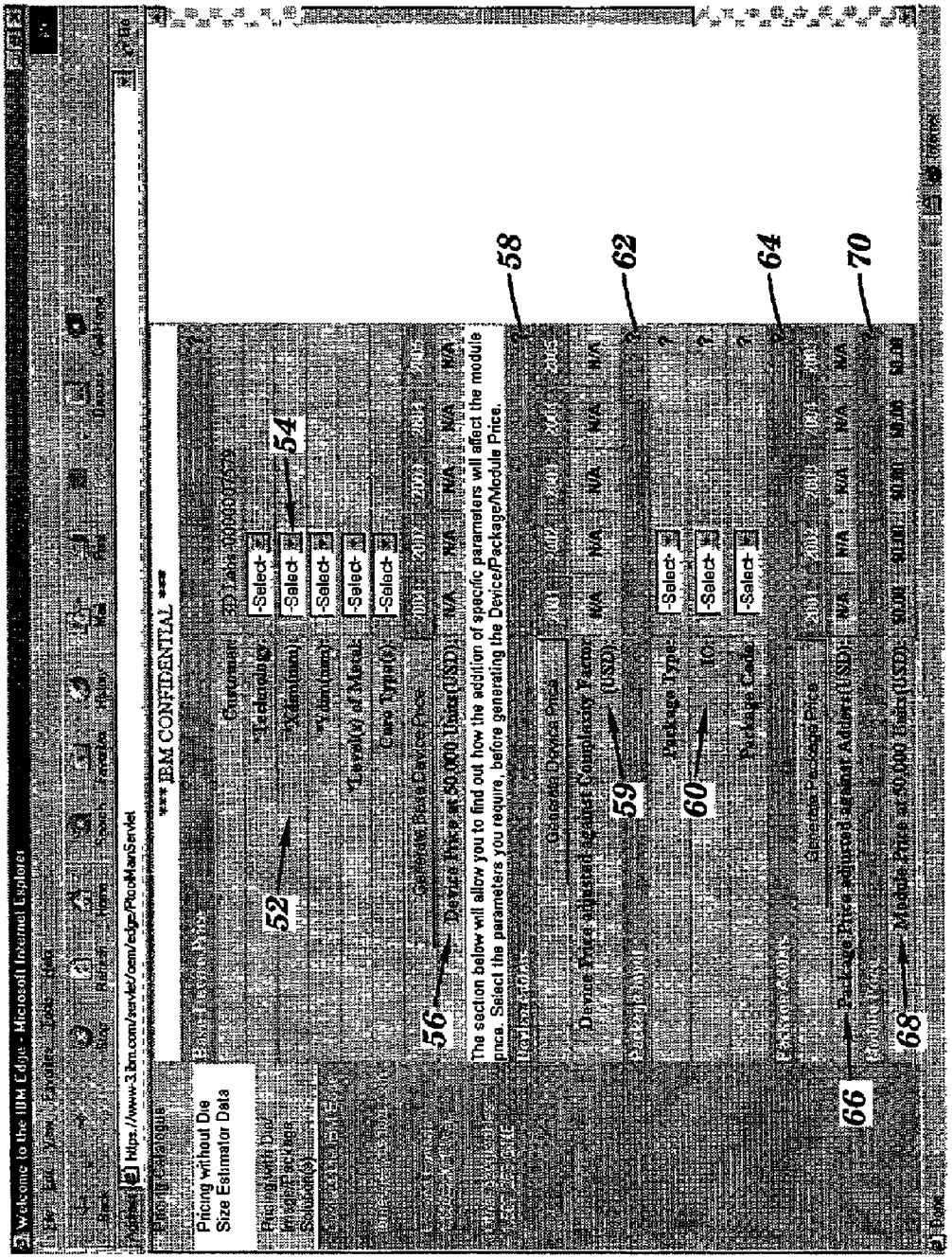
FIG. 3 depicts a user interface according to one aspect of the invention.

FIG. 3 depicts user interface(s) for carrying out the present invention according to one embodiment of the invention. In this case, a web based interface 50 allows user 26 to select base parameters 52. Base parameters 52 are indicated by an asterisk (*) next to the identifier. Interface 50 limits the options for base parameters 52 by using a drop down list 54 to ensure that only valid base parameters are designated. Once selected, a base price 56 can be generated and displayed based on an assumed quantity (e.g., 50,000 Units). Interface 50 further allows custom parameters (device adders) to be defined in device adders area 58 after base parameters 52 have been defined. This allows interface 50 to only present those options available for the particular base parameters 52 selected. Once further custom parameters are selected, custom die price 59 can be displayed.

At any time, a user can select packaging parameters 60 in package input area 62. Based on selections for packaging parameters 60, other parameters may be presented in package adders area 64. A separate package price 66 can be displayed based on packaging parameters 60. A chip price 68 is displayed in module price area 70 based on package price 66 and custom die price 53.

It is understood that the various systems previously discussed are presented in this manner for clarity, and can be implemented in any combination and configuration. The various systems of die pricing system 28 shown in FIG. 1 and chip pricing system 40 shown in FIG. 2 can be implemented on separate computers or combined into fewer systems. Additionally, the functions provided by each system can be combined or rearranged among systems without departing from the invention. For example, complexity system 36 and calculation system 38 can be located on a separate computer (not shown) and/or combined into a single system. Alternatively, base die system 30 and custom die system 34 can be combined into a single system that designates all die parameters.

Figure 4:
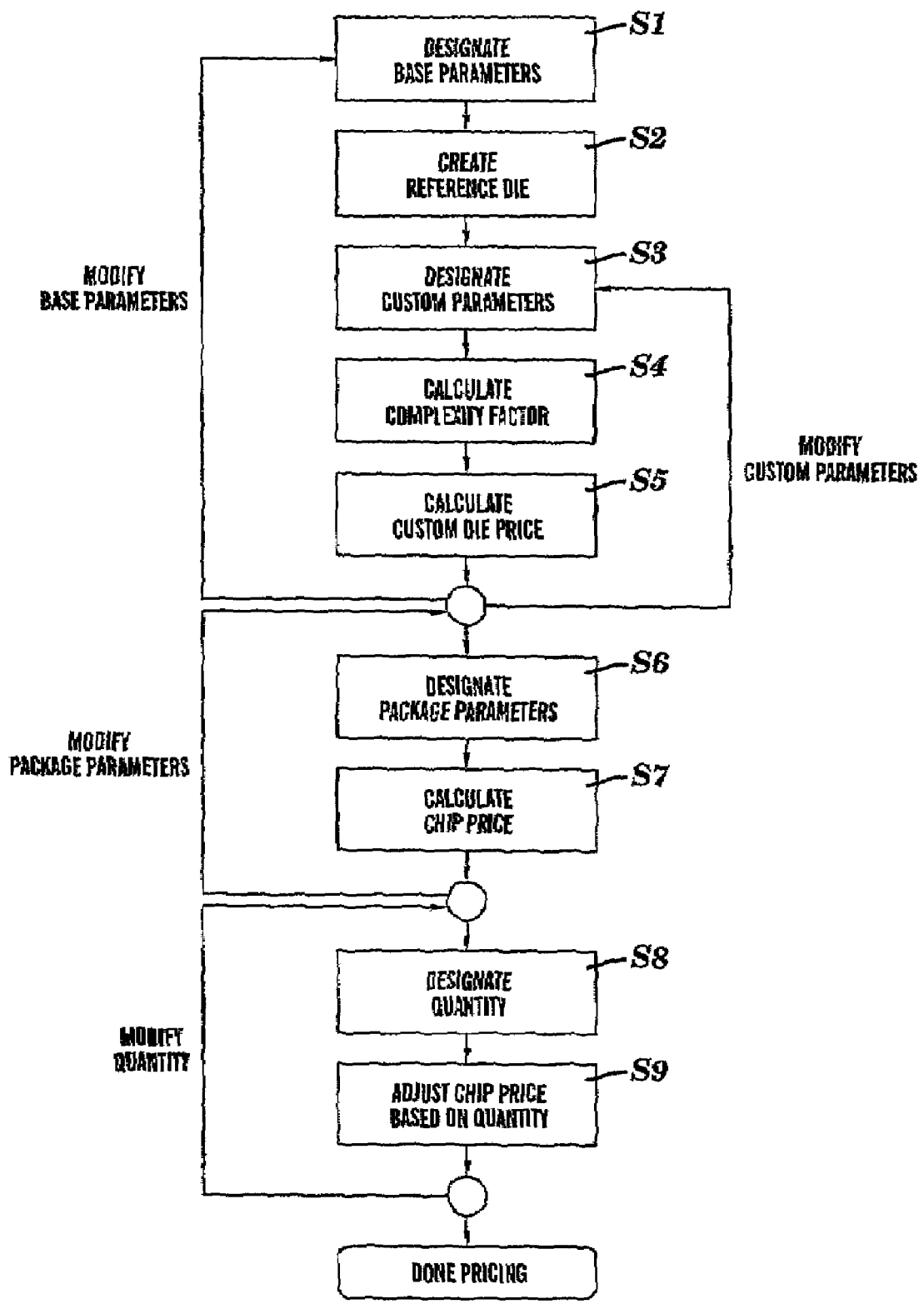
FIG. 4 depicts a chip pricing method according to one aspect of the invention.

FIG. 4 depicts a chip pricing method according to one aspect of the invention. Initially, the base parameters are designated (a base die is selected) in step S1. A reference die can then be created in step S2 based on the base parameters. Custom parameters are designated in step S3 to yield a custom die. Based on the custom parameters and the reference die, a complexity factor is calculated in step S4. The custom die price is then calculated in step S5 based on the base parameters, the custom parameters and the complexity factor. Various steps of the method can be repeated, for example, a user can choose to modify one or more of the base parameters thereby necessitating the creation of a new reference chip. Conversely, a user can modify one or more of the custom parameters and view the effects that these modifications have on the custom die price.

Package parameters can be designated in step S6. Step S7 can then calculate a chip price based on the custom die price and designated package parameters. This calculation may include first calculating a packaging price using the packaging parameters and adding/subtracting this price to/from the custom die price. A user can select to modify the package parameters to obtain a new chip price. Additionally, the user remains able to modify base parameters and/or custom parameters for the custom chip.

Step S8 allows a quantity to be designated, and the chip price may be adjusted in step S9 based on the quantity designated. Depending on several factors, including manufacturing parameters, various quantities may cause the chip price to be adjusted upward, downward or remain the same. For example, a quantity of one hundred chips may be requested which, due to the manufacturing process, inefficiently uses the machinery and/or material. Consequently, the price of each chip may be adjusted upward. As before, a user can modify the quantity or any of the other parameters to obtain a new chip price.

It is understood that the method depicted in FIG. 4 is only exemplary of the methods of the invention. Each step is shown in a linear fashion for clarity. Steps may be performed in parallel (for example, steps S2 and S3), and/or the order of the steps can be modified. Additionally, when steps are repeated, all subsequent steps may not be required. For example, when a user decides to modify a base parameter (step S1), it may not be necessary for the user to designate the custom parameters (step S3) again.

Finally, the previous discussions detail the creation of a custom die, followed by packaging, followed by quantity. It is understood that the these selections can be made in any order under the invention. For example, a user could first designate packaging parameters, then a quantity, followed by the custom die.

In the previous discussion, it is understood that the method steps discussed can be performed by a processor, such as CPU 16 of computer 12, executing instructions of a program product (for example, die pricing system 28) stored in memory 14. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which, when loaded in a computer system, is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computerized method of calculating a custom die price, comprising:
   providing an interface for designating base parameters;
   obtaining the base parameters;
   selecting a base die based on the base parameters;
   creating a reference die based on a design methodology and the base parameters;
   calculating a complexity factor based on designated custom parameters and the reference die; and
   calculating the custom die price based on the base die, the custom parameters and the complexity factor.

2. The method of claim 1, wherein the base parameters include a technology, an X-dimension, a Y-dimension and a number of levels of metal.

3. The method of claim 1, wherein the selecting step includes:
   providing a set of possible base dies based on the base parameters; and
   selecting the base die from the set of possible base dies.

4. The method of claim 1, wherein the reference die is a most complex die available based on the base parameters.

5. The method of claim 1, wherein the custom parameters include a core, an oxide level, a solder type, a cell logic circuit count, register array parameters and memory parameters.

6. The method of claim 1, wherein the calculating a complexity factor step includes:
   creating a custom die having the base parameters and the custom parameters;
   determining a custom die yield;
   determining a reference die yield; and
   dividing the custom die yield by the reference die yield to provide the complexity factor.

7. The method of claim 1, wherein the calculating the custom die price step includes:
   calculating a base die price for the base die;
   providing the custom die price by modifying the base die price based on the custom parameters; and
   adjusting the custom die price using the complexity factor.

8. The method of claim 1, further comprising calculating a chip price based on the custom die price and designated package parameters.

9. The method of claim 8, further comprising:
   designating a chip quantity; and
   adjusting the chip price based on the chip quantity.

10. A computerized method of calculating a custom die price, comprising:
    designating base parameters;
    calculating a base die price based on the base parameters;
    creating a reference die based on a design methodology and the base parameters;
    creating a custom die by designating custom parameters;

calculating a complexity factor based on the custom die and the reference die; and calculating the custom die price based on the base die price, the custom die and the complexity factor.

11. The method of claim 10, wherein the designating step includes:

providing a set of possible base dies; and selecting a base die from the set of possible base dies.

12. The method of claim 11, wherein the designating step further includes selecting a first base parameter, wherein each possible base die includes the first base parameter.

13. The method of claim 10, wherein the calculating a complexity factor step includes:

determining a custom die yield based on the custom die;

determining a reference die yield based on the reference die; and dividing the custom die yield by the reference die yield to provide the complexity factor.

14. The method of claim 10, wherein the calculating the custom die price step includes:

modifying the base die price based on the custom parameters to provide the custom die price; and adjusting the custom die price using the complexity factor.

15. The method of claim 10, further comprising calculating a chip price based on the custom die price and designated package parameters.

16. The method of claim 15, further comprising:

designating a chip quantity; and adjusting the chip price based on the chip quantity.

17. A system for determining a custom die price, comprising:

a base die system for designating base parameters;

a reference die system for creating a reference die based on the base parameters and a design methodology;

a custom die system for designating custom parameters;

a complexity system for calculating a complexity factor based on the custom parameters and the reference die; and a calculation system for calculating the custom die price based on the base parameters, the custom parameters and the complexity factor.

18. The system of claim 17, further comprising a packaging system for calculating a chip price based on the custom die price and designated packaging parameters.

19. The system of claim 18, further comprising a volume system for adjusting the chip price based on a designated quantity.

20. A computer program product comprising a computer useable medium having computer readable program code embodied therein for determining a custom die price, the program product comprising:

program code for designating base parameters;

program code for calculating a base die price based on the base parameters;

program code for creating a reference die based on a design methodology and the base parameters;

program code for creating a custom die by designating custom parameters;

program code for calculating a complexity factor based on the custom die and the reference die; and program code for calculating a custom die price based on the base die price, the custom die and the complexity factor.

21. The computer program product of claim 20, wherein the program code for designating base parameters includes:

program code for providing a set of possible base dies; and program code for selecting a base die from the set of possible base dies.

22. The computer program product of claim 21, wherein the program code for designating base parameters further includes program code for selecting a first base parameter, wherein each possible base die includes the first base parameter.

23. The computer program product of claim 20, wherein the program code for calculating a complexity factor includes:

program code for determining a custom die yield based on the custom die; and program code for determining a reference die yield based on the reference die.

24. The computer program product of claim 20, wherein the program code for calculating a custom die price includes:

program code for calculating a custom die price for the custom die using the base die price and the custom die; and program code for adjusting the custom die price using the complexity factor.

25. The computer program product of claim 20, further comprising program code for calculating a chip price based on the custom die price and designated package parameters.

26. The computer program product of claim 20, further comprising:

program code for providing an interface for designating a chip quantity; and program code for adjusting the chip price based on the chip quantity.

* * * * *